United States Patent

Rahmouni

(10) Patent No.: US 11,821,180 B1
(45) Date of Patent: Nov. 21, 2023

(54) INTEGRATED SYSTEM FOR COLLECTING RAINWATER FOR IRRIGATION AND WATERING PLANTS

(71) Applicant: King Faisal University, Al-Ahsa (SA)

(72) Inventor: Mohieddine Rahmouni, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/117,605

(22) Filed: Mar. 6, 2023

(51) Int. Cl.
*E03B 3/02* (2006.01)
*A45B 23/00* (2006.01)

(52) U.S. Cl.
CPC ............... *E03B 3/02* (2013.01); *A45B 23/00* (2013.01); *A45B 2023/0018* (2013.01); *Y02A 20/108* (2018.01)

(58) Field of Classification Search
CPC . A45B 23/00; A45B 2023/0018; A45B 25/28; A45B 2025/003; A45B 2200/1009; A45B 2011/005; A45B 19/10; A45B 19/12; A45B 2019/004; A45B 2019/008; A45B 2023/0012; A45B 25/006; A45B 25/14; A45B 25/143; E03B 3/02; E04H 15/02; E04H 15/26; E04H 15/28; Y02A 20/00; Y02A 20/108
USPC ............................................. 137/1, 343, 356
See application file for complete search history.

(56) References Cited

U.S. PATENT DOCUMENTS

| | | | | | |
|---|---|---|---|---|---|
| 5,441,068 | A * | 8/1995 | Rasch | ..................... | A45B 23/00 135/98 |
| 5,740,824 | A * | 4/1998 | Tang | ..................... | A45B 25/28 135/39 |
| 2005/0133090 | A1* | 6/2005 | Couturier | .................. | E03B 3/02 137/236.1 |
| 2010/0307057 | A1* | 12/2010 | Hashimoto | ........... | E04D 11/002 47/79 |
| 2011/0132823 | A1* | 6/2011 | Brown | ..................... | E04H 15/28 210/170.03 |
| 2012/0183407 | A1 | 7/2012 | Vaellejo | | |
| 2017/0314289 | A1* | 11/2017 | Kapur | ..................... | A45B 23/00 |
| 2017/0328039 | A1* | 11/2017 | Vakil | ......................... | E03B 3/40 |
| 2020/0063461 | A1* | 2/2020 | Gharabegian | ........ | A45B 25/143 |

(Continued)

FOREIGN PATENT DOCUMENTS

| AU | 2006100623 A4 | 9/2006 |
|---|---|---|
| WO | 2016092567 A1 | 6/2016 |

OTHER PUBLICATIONS

Travers, Julia "This "Inverted Umbrella" Harvests DrinkingWater and Solar Energy"; Ask Artists with Julia Travers; Invironment; May 10, 2017.

(Continued)

*Primary Examiner* — Kevin F Murphy
*Assistant Examiner* — Jonathan J Waddy
(74) *Attorney, Agent, or Firm* — Nath, Goldberg & Meyer; Richard C. Litman

(57) ABSTRACT

An umbrella like structure deployed in an inverted configuration that acts as a funnel and collection area to receive rainwater. The center of the umbrella is connected to a support structure which includes tubing that transfers the water to a collection tank via an irrigation system. The umbrella like structure has further applications as providing shade and additional protection for the vegetation underneath.

8 Claims, 3 Drawing Sheets

(56) References Cited

U.S. PATENT DOCUMENTS

2021/0140150 A1* 5/2021 Navarro Alvarado .... E03B 3/02
2021/0301550 A1* 9/2021 Volin ...................... E04H 15/28

OTHER PUBLICATIONS

Goetvinck, Elizabeth "Stand-Alone Rainwater Collector"; Autodesk Instructables; 2022.

* cited by examiner

INTEGRATED SYSTEM FOR COLLECTING RAINWATER FOR IRRIGATION AND WATERING PLANTS

BACKGROUND

1. Field

The disclosure of the present patent application relates to a device, method, system, and/or apparatus for collecting rainwater for irrigation and watering plants.

2. Description of the Related Art

Precipitation is one crucial factor in maintaining growth and ecological balance on the planet. However, rapid development and concretization of open spaces such as roads, grounds, public plazas, parking areas, and the like have resulted in large storm water run-offs that can overtax urban drainage systems and therefore remain uncollected and are wasted as a source of water. This leads to a problem of inefficient usage and preservation of rainwater. Due to the global population growth, the demand for usable water increases while resources for water are stretched beyond capacity, leading to water rationing in some areas of the world.

Further, since society has relied primarily upon electricity as a power source, the use of fossil fuels in hydrocarbon-based power plants releases pollutants into the air, which exacerbate the global warming problem. The two main pollutants of sulfur dioxide and nitrogen oxide react with water or moisture in the air to form nitric and sulfuric acid, which fall to the ground as acid rain and have a deleterious effect on trees, soil, and waterways, among others. Additionally, mercury emissions which are released into the air through the smokestacks of coal burning power plants end up settling on rivers, lakes, ponds, estuaries, bays, and the like.

In global areas where water is a precious commodity by either being scarce or unavailable from centralized water distribution systems, various methods and techniques must be relied upon to address these problems. One such solution is to catch rainwater before it reaches the ground and runs off. However, traditional methods rely upon the use of roofs, which funnel the water through a network of gutters to a cistern, or building paved areas on suitably sloped ground, and channeling water to a cistern. However, there are drawbacks with such traditional methods. Firstly, they are always open and therefore lead to the accumulation of undesired debris, bird, and other animal waste, thus making the water unusable for direct consumption. Additionally, they are permanently deployed and cannot be moved as desired and, further, are usually rigid structures, which are unwieldy to employ beyond moderate sizes. Furthermore, they require constant attention and cannot be left unattended.

Accordingly, a way to safely harvest rainwater and thereby avoid the problems discussed above is desired.

SUMMARY

The present subject matter relates to an integrated system and method for collecting rainwater for irrigation and watering plants that provides harvested rainwater in an efficient way. In this regard, the present subject matter relates to an integrated system having an umbrella like section used in an inverted vertical configuration as a funnel to receive rainwater. At the center is a funnel which is open and allows the water to flow down vertical tubing, which has the dual aim of channeling the collected rainwater to subsequent pipe networks and storage systems. A mechanism consisting of a series of pulleys and an electric motor, expands and collapses the umbrella like section as is required. An operation schedule of the umbrella like section is either pre-programmed by a controller, or user activated by a control panel which is connected to the controller.

In one embodiment, the present subject matter relates to an integrated system for collecting rainwater for irrigation, comprising an umbrella like section, the umbrella-like section comprising an inverted funnel section comprising at least one inverted funnel which connects to a canopy section comprising at least one canopy, such that a volume formed from a combination of the inverted funnel section and the canopy section is configured to temporarily store collected rainwater; a central vertical mast connected to a bottom of each of the at least one inverted funnels in the inverted funnel section, where each said central vertical mast has a bottom portion that rests on a ground area; a controller mounted on at least one of said central vertical masts, the controller having a user interface to input commands to the integrated system; a tube contained within each said central vertical mast and traversing a length of the central vertical mast for transferring the collected rainwater from the formed volume of the combination of the inverted funnel section and the canopy section to a pipe network; and a plurality of support arms for providing support to the combination of the inverted funnel section and the canopy section.

In another embodiment, the present subject matter relates to a method for collecting rainwater for irrigation, comprising providing an umbrella like section comprising an inverted funnel section comprising at least one inverted funnel which connects to a canopy section comprising at least one canopy, forming a volume from a combination of the inverted funnel section and the canopy section to temporarily store collected rainwater; providing support to the combination of the inverted funnel section and the canopy section via a plurality of support arms; and transferring the collected rainwater from the formed volume of the combination of the inverted funnel section and the canopy section to a pipe network via a tube contained within and traversing a length of a central vertical mast connected to a bottom of each of the at least one inverted funnels in the inverted funnel section, where each said central vertical mast has a bottom portion that rests on a ground area.

In a further embodiment, the present subject matter relates to an integrated system for collecting rainwater for irrigation, comprising an umbrella like section, the umbrella-like section comprising an inverted funnel section comprising at least one inverted funnel which connects to a canopy section comprising at least one canopy, such that a volume formed from a combination of the inverted funnel section and the canopy section is configured to temporarily store collected rainwater; a central vertical mast connected to a bottom of each of the at least one inverted funnels in the inverted funnel section, where each said central vertical mast has a bottom portion that rests on a ground area; a controller mounted on at least one of said central vertical masts, the controller having a user interface to input commands to the integrated system; a tube contained within each said central vertical mast and traversing a length of the central vertical mast for transferring the collected rainwater from the formed empty volume of the combination of the inverted funnel section and the canopy section to a pipe network; a plurality of support arms consisting of a plurality of inner support arms connected to a plurality of outer support arms for providing support to the combination of the inverted funnel section and the canopy section; and a hydraulic system for expanding and retracting the plurality of inner support arms and the plurality of outer support arms, wherein as a result of the expanding, each of the at least one inverted funnel and the at least one canopy in the combination of the inverted funnel section and the canopy section is deployed to a full collection volume for collecting rainwater, while as a result of the retracting, each of the at least one inverted funnel and the at least one canopy in the combination of the inverted funnel section and the canopy section is collapsed into a compact arrangement about the corresponding central vertical mast, wherein the controller controls the hydraulic system to expand or retract the combination of the inverted funnel section and the canopy section, wherein a top portion of each said central vertical mast has sensors for sensing the volume of collected rainwater in the volume formed from the combination of the inverted funnel section and the canopy section, and wherein the tube contained within each said central vertical mast has a pump connected to the tube to pump the volume of collected rainwater down and through the tube and into the pipe network when the sensors sense the volume of the collected rainwater is such that the combination of the inverted funnel section and the canopy section is in danger of overflowing.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF EMBODIMENTS

Throughout the application, where a system, apparatus, or the like are described as having, including, or comprising specific components, or where processes or methods are described as having, including, or comprising specific process or method steps, it is contemplated that the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event, circumstance, or component may or may not occur, or may or may not be present and that the description includes instances where said event or circumstance occurs and instances in which it does not.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The integrated system and method for collecting rainwater for irrigation and watering plants is provided herewith mainly as a tool to collect rainwater falling across an area of open space.

Figure 1:
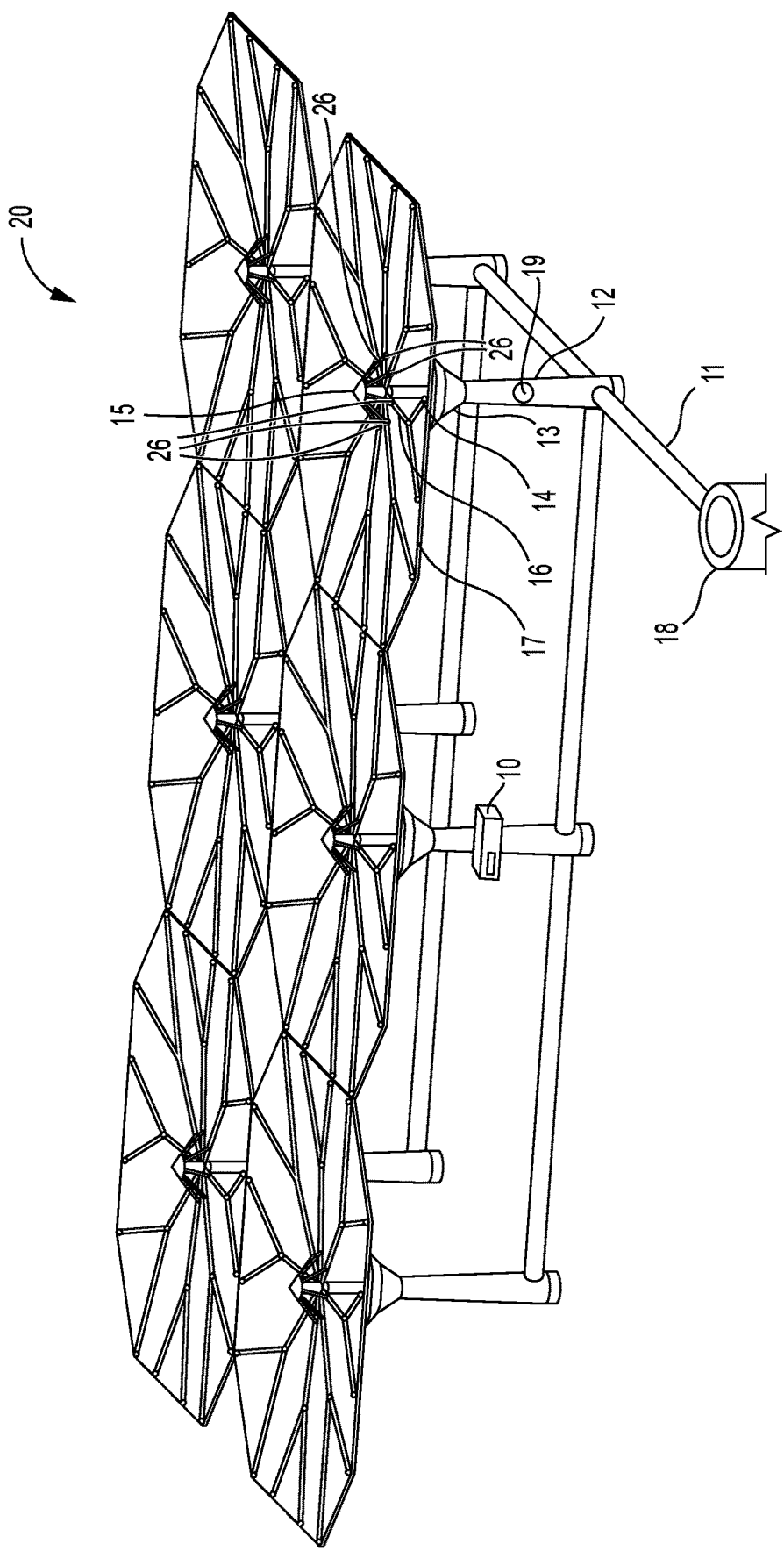
FIG. 1 is a perspective view of an array of umbrella like sections providing coverage over an area of land, said array being connected to a network of pipes and a storage tank.

FIG. 1 shows a collection (20) of umbrella like sections over an open area of land. Inverted funnels (13) formed by umbrella like sections form a tessellated pattern that prevents any gaps from being formed in the collection of umbrella like sections. In one embodiment, the canopy shape (17) of each one of the umbrella like sections is that of a mostly square shape, but other shapes can be used as long as they allow for sufficient tessellation (i.e., by way of non-limiting example, triangles, rectangles, and the like). As such, all the falling rainwater is caught by the array of inverted funnels (13), and a negligible amount of water is lost to the ground below. In each umbrella like section, the inverted funnel (13) is formed by a canopy of material that is water-proof or otherwise suitable for the task of collecting and retaining water until such time as a controller (10) initiates a transfer of the water through tubing contained in a central vertical mast (12) of each umbrella like section to the pipe network (11) and storage tank (18).

Figure 2:
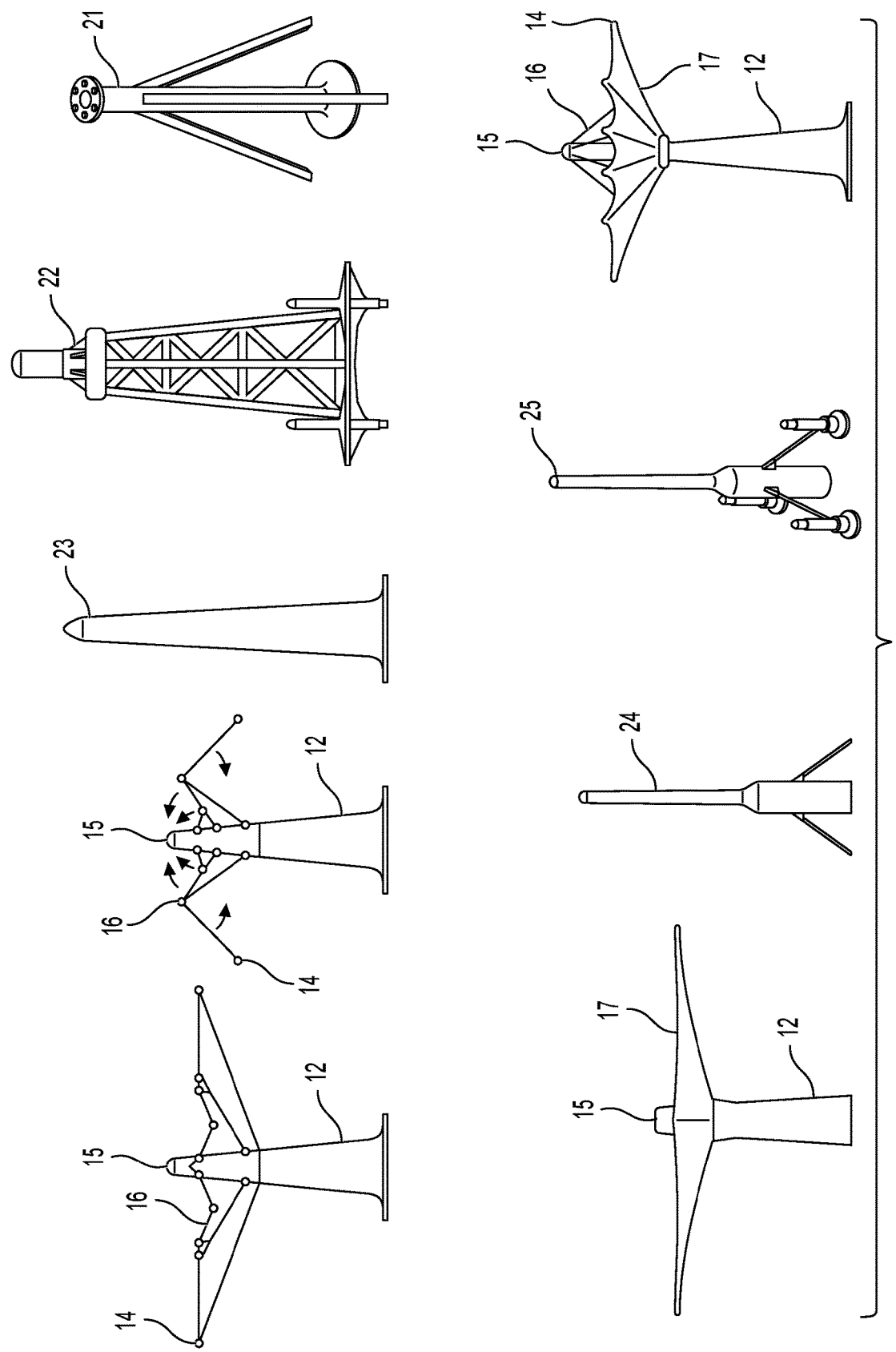
FIG. 2 is a side view in stages of an umbrella like section showing an expanded configuration, a retracted configuration, and a canopy deployed configuration on the left side of the figure. Also shown are various other designs of the central support mast of the umbrella section.

As shown in the diagrams of FIG. 2, the mostly square shaped canopies (17) of the umbrella like sections work in a like manner as a standard shade umbrella does when closing and opening by bending of inner support arms (16) and outer support arms (14), accordingly. In an embodiment, the support arms (14, 16) of the umbrella like section are in a closed and compact configuration when the canopy (17) is not in use and are open and fully extended when the canopy (17) is to be deployed and in use. In another embodiment, the support arms (14, 16) of the umbrella like section are articulated to a desired position by a hydraulic system also contained within the central vertical mast (12). In a further embodiment, the support arms (14, 16) are constructed of a material such that, when extended, the configuration of support arms (14, 16) provides sufficient weight-bearing support to the fully expanded canopy (17) and the volume of rainwater collected when accumulating rainwater. The construction and placement of the support arms are determined according to the weight and coverage area of each canopy (17). Optimally, the shape of the funnel (13) formed by the deployed canopy (17) does not allow for the collected rainwater to stagnate above the canopy (17), as the rainwater passes directly through the central vertical mast (12) of each umbrella like section by means of the section of tubing contained within each central vertical mast (12).

As noted, each umbrella like section functions under the auspices of a controller (10), which allows a user to control the expansion and retraction operations of the support arms (14, 16) and the canopy (17) by manually inputting respective commands. By way of non-limiting example, such commands can be input by way of a known user interface such as a touchscreen. The controller also allows for an automated schedule to be input therein by a user, such that the expansion and retraction of operations of the support arms and canopy are executed later in time in accordance with the automation schedule. Additionally, each central vertical mast (12) may also optionally house a pump (19) to help pump the water down and through the tubing into the connected pipe network (11) and storage tank (18) if needed in order to prevent the canopy from overflowing with collected rainwater in the event of a sudden downpour. The activation of the pump (19) would also be controlled by the controller (10) in such a manner that the controller would measure the rate of filling of the canopy (17) using sensors (26) located near the top end (15) of the central vertical mast (12), and if the collected water rises to the level of the sensors (26), the controller (10) would activate the pump (19) and start pumping the collected rainwater down and through the tubing contained within the central vertical mast (12).

Figure 3:
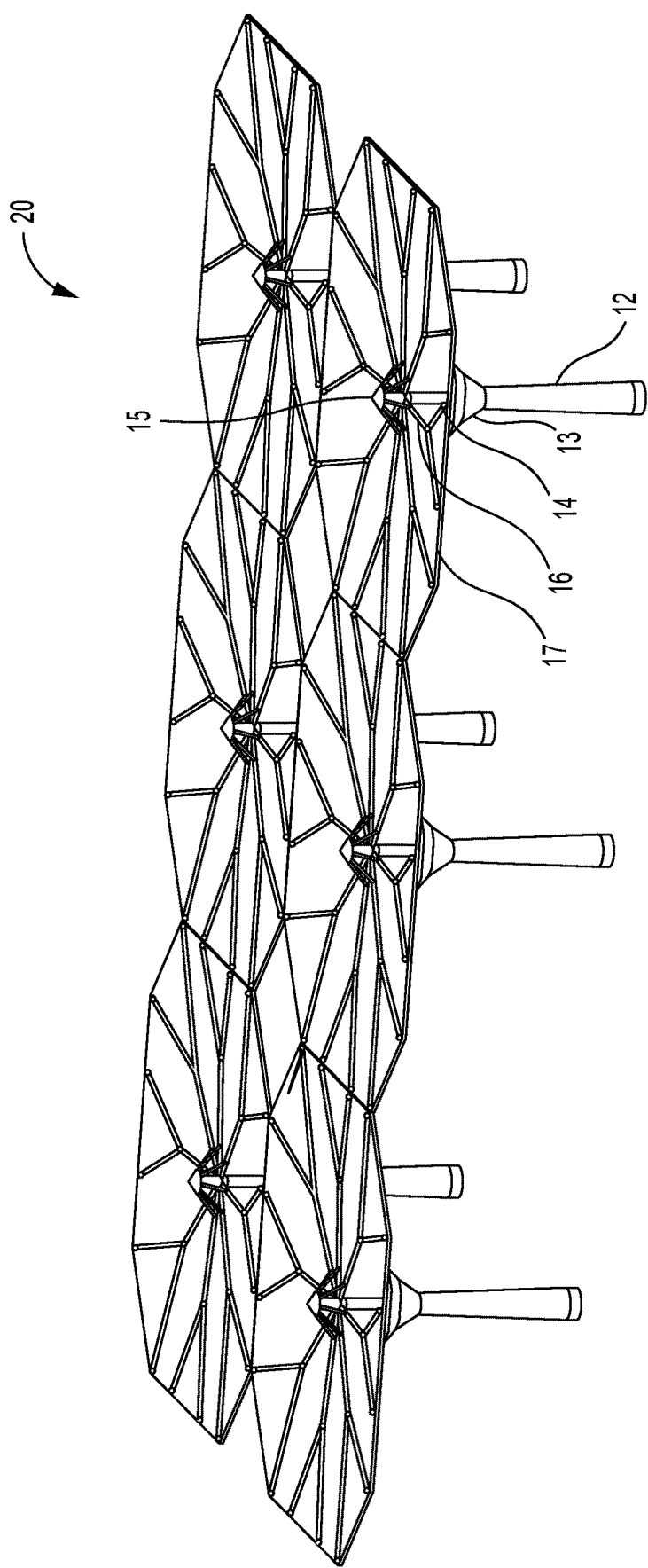
FIG. 3 is a perspective view of an array of umbrella like sections providing coverage over an area of land.

The size of each canopy is determined according to the area to be covered, the budget allocated for it, the rate and amount of seasonal rainfall, wind speed profiles in the designated area, and the like. In one non-limiting example, if the area covered by one canopy can be 400 square meters, then 25 canopies arranged in a tessellated pattern, a portion of which is shown in FIG. 3, can amount to a covered area (20) of 10,000 square meters, or 1 hectare. With an annual rainfall of 200 mm, each canopy can collect 80 cubic meters per year (80,000 liters), and when extrapolated out to a canopy collection of 1 hectare, the collected amount of rainwater would be a significant amount (2,000,000 liters).

Additionally, it is noted that the central vertical mast (12) may also require additional supporting elements to ensure that it stays erect, especially in an environment subject to high winds. Anchoring at the base of the central vertical mast (12) may be desired in this regard. As shown in FIG. 2, in an embodiment the central vertical mast (12) may further include supporting and anchoring stakes (22), a companion tripod (21), support lines (24), and a support line and stake configuration (25).

While the implementation of a collection of umbrella like sections as configured in the tessellated pattern of FIGS. 1 and 3 is primarily intended for rainwater collection and transferal to complimentary storage elements, other advantageous uses of collection of umbrella sections are evident. For instance, an additional use would be for the deployed collection of umbrella-like sections to provide a protective cover to plants to protect the associated vegetation from other detrimental growth factors (extreme light, temperature, hail, heavy seasonal rain, relative humidity, and severe cold snaps).

In another embodiment, the present subject matter relates to a method for collecting rainwater for irrigation, comprising: providing an umbrella like section comprising an inverted funnel section comprising at least one inverted funnel which connects to a canopy section comprising at least one canopy, forming a volume from a combination of the inverted funnel section and the canopy section to temporarily store collected rainwater; providing support to the combination of the inverted funnel section and the canopy section via a plurality of support arms; and transferring the collected rainwater from the formed volume of the combination of the inverted funnel section and the canopy section to a pipe network via a tube contained within and traversing a length of a central vertical mast connected to a bottom of each of the at least one inverted funnels in the inverted funnel section, where each said central vertical mast has a bottom portion that rests on a ground area.

In this regard, the present methods can further comprise expanding and retracting the plurality of support arms using a hydraulic system. Further, the expanding and retracting of the plurality of support arms can be controlled via user commands input through a controller mounted on at least one of said central vertical masts. In this regard, the user commands can be manually input commands to be operated on immediately or can be an automated schedule to be operated on later in time.

In another embodiment, the present methods can further comprise watering nearby plants with the collected rainwater, either directly or via a collection tank wherein the volume of collected rainwater is transferred from the pipe network to the collection tank.

It is to be understood that the integrated system and method for collecting rainwater for irrigation and watering plants provided herewith is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method for collecting rainwater for irrigation, comprising:
providing an umbrella like section comprising an inverted funnel section comprising at least one inverted funnel which connects to a canopy section comprising at least one canopy,
forming a volume from a combination of the inverted funnel section and the canopy section to temporarily store collected rainwater;
providing support to the combination of the inverted funnel section and the canopy section via a plurality of support arms;
transferring the collected rainwater from the formed volume of the combination of the inverted funnel section and the canopy section to a pipe network via a tube contained within and traversing a length of a central vertical mast connected to a bottom of each of the at least one inverted funnels in the inverted funnel section, where each said central vertical mast has a bottom portion that rests on a ground area; and
expanding and retracting the plurality of support arms using a hydraulic system, said expanding and retracting being is controlled via user commands input through a controller mounted on at least one of said central vertical masts, said user commands are manually input commands to be operated on immediately or are an automated schedule to be operated on later in time, wherein a top portion of each said central vertical mast has sensors for sensing the volume of collected rainwater in the volume formed from the combination of the inverted funnel section and the canopy section.

2. The method of claim 1, further comprising watering nearby plants with the collected rainwater, either directly or via a collection tank wherein the volume of collected rainwater is transferred from the pipe network to the collection tank.

3. An integrated system for collecting rainwater for irrigation, comprising: an umbrella like section comprising:
  an inverted funnel section comprising at least one inverted funnel which connects to a canopy section comprising at least one canopy, such that a volume formed from a combination of the inverted funnel section and the canopy section is configured to temporarily store collected rainwater;
  a central vertical mast connected to a bottom of each of the at least one inverted funnels in the inverted funnel section, where each said central vertical mast has a bottom portion that rests on a ground area;
  a controller mounted on at least one of said central vertical masts, the controller having a user interface to input commands to the integrated system;
  a tube contained within each said central vertical mast and traversing a length of the central vertical mast for transferring the collected rainwater from the formed volume of the combination of the inverted funnel section and the canopy section to a pipe network; and
  a plurality of support arms for providing support to the combination of the inverted funnel section and the canopy section; and
  wherein the plurality of support arms consists of a plurality of inner support arms connected to a plurality of outer support arms,
  a hydraulic system for expanding and retracting the plurality of inner support arms and the plurality of outer support arms,
  wherein as a result of the expanding, each of the at least one inverted funnel and the at least one canopy in the combination of the inverted funnel section and the canopy section is deployed to a full collection volume for collecting rainwater,
  wherein as a result of the retracting, each of the at least one inverted funnel and the at least one canopy in the combination of the inverted funnel section and the canopy section is collapsed into a compact arrangement about the corresponding central vertical mast,
  wherein the controller controls the hydraulic system to expand or retract the combination of the inverted funnel section and the canopy section,
  wherein a user can manually input commands to the controller to directly expand and retract the combination of the inverted funnel section and the canopy section using the hydraulic system,
  wherein an automated schedule is input by the user into the controller for automatically executing scheduled expand and retract commands for the combination of the inverted funnel section and the canopy section, and
  wherein a top portion of each said central vertical mast has sensors for sensing the volume of collected rainwater in the volume formed from the combination of the inverted funnel section and the canopy section.

4. The integrated system for collecting rainwater for irrigation, as recited in claim 1, wherein the controller has a user interface comprising a touchscreen.

5. The integrated system for collecting rainwater for irrigation, as recited in claim 1, wherein the tube contained within each said central vertical mast has a pump connected to the tube to pump the volume of collected rainwater down and through the tube and into the pipe network when the sensors sense the volume of the collected rainwater is such that the combination of the inverted funnel section and the canopy section is in danger of overflowing.

6. The integrated system for collecting rainwater for irrigation, as recited in claim 5, wherein the volume of collected rainwater is transferred from the pipe network to a collection tank.

7. The integrated system for collecting rainwater for irrigation, as recited in claim 1, wherein the combination of the inverted funnel section and the canopy section provides shade and additional protection to underneath vegetation.

8. An integrated system for collecting rainwater for irrigation, comprising: an umbrella like section comprising:
  an inverted funnel section comprising at least one inverted funnel which connects to a canopy section comprising at least one canopy, such that a volume formed from a combination of the inverted funnel section and the canopy section is configured to temporarily store collected rainwater;
  a central vertical mast connected to a bottom of each of the at least one inverted funnels in the inverted funnel section, where each said central vertical mast has a bottom portion that rests on a ground area;
  a controller mounted on at least one of said central vertical masts, the controller having a user interface to input commands to the integrated system;
  a tube contained within each said central vertical mast and traversing a length of the central vertical mast for transferring the collected rainwater from the formed empty volume of the combination of the inverted funnel section and the canopy section to a pipe network;
  a plurality of support arms consisting of a plurality of inner support arms connected to a plurality of outer support arms for providing support to the combination of the inverted funnel section and the canopy section; and
  a hydraulic system for expanding and retracting the plurality of inner support arms and the plurality of outer support arms,
  wherein as a result of the expanding, each of the at least one inverted funnel and the at least one canopy in the combination of the inverted funnel section and the canopy section is deployed to a full collection volume for collecting rainwater, while as a result of the retracting, each of the at least one inverted funnel and the at least one canopy in the combination of the inverted funnel section and the canopy section is collapsed into a compact arrangement about the corresponding central vertical mast,
  wherein the controller controls the hydraulic system to expand or retract the combination of the inverted funnel section and the canopy section,
  wherein a top portion of each said central vertical mast has sensors for sensing the volume of collected rainwater in the volume formed from the combination of the inverted funnel section and the canopy section, and
  wherein the tube contained within each said central vertical mast has a pump connected to the tube to pump the volume of collected rainwater down and through the tube and into the pipe network when the sensors sense the volume of the collected rainwater is such that the combination of the inverted funnel section and the canopy section is in danger of overflowing.

\* \* \* \* \*